US008259681B2

United States Patent
Lee et al.

(10) Patent No.: US 8,259,681 B2
(45) Date of Patent: Sep. 4, 2012

(54) METHOD OF DCR OPERATION IN A BROADBAND WIRELESS COMMUNICATION SYSTEM

(75) Inventors: Jin Lee, Anyang-si (KR); Yong Ho Kim, Anyang-si (KR); Ki Seon Ryu, Anyang-si (KR)

(73) Assignee: LG Electronics Inc., Seoul (KR)

( * ) Notice: Subject to any disclaimer, the term of this patent is extended or adjusted under 35 U.S.C. 154(b) by 313 days.

(21) Appl. No.: 12/786,135

(22) Filed: May 24, 2010

(65) Prior Publication Data

US 2010/0296426 A1   Nov. 25, 2010

Related U.S. Application Data

(60) Provisional application No. 61/180,883, filed on May 24, 2009, provisional application No. 61/238,197, filed on Aug. 30, 2009, provisional application No. 61/294,098, filed on Jan. 11, 2010, provisional application No. 61/238,640, filed on Aug. 31, 2009.

(30) Foreign Application Priority Data

Mar. 9, 2010   (KR) ........................ 10-2010-0020740

(51) Int. Cl.
*H04W 4/00*   (2009.01)
*H04J 3/06*   (2006.01)
(52) U.S. Cl. ......................... 370/331; 370/338; 370/503
(58) Field of Classification Search ....................... None
See application file for complete search history.

(56) References Cited

U.S. PATENT DOCUMENTS

2011/0044307 A1 *   2/2011   Mohanty et al. ............. 370/338

FOREIGN PATENT DOCUMENTS

| KR | 10-0788899 B1 | 12/2007 |
| WO | WO 2006/073228 A1 | 7/2006 |
| WO | WO 2008/153343 A1 | 12/2008 |

OTHER PUBLICATIONS

PCT Written Opinion on current application:: Dec. 23, 2010.*
IEEE Standard for Local and Metropolitan Area Networks—Part 16:: Air Interface for Broadband Wireless Access Systems—Amendment 3: Advanced Air Interface (2011).*

* cited by examiner

*Primary Examiner* — Xavier Szewai Wong
(74) *Attorney, Agent, or Firm* — Birch, Stewart, Kolasch & Birch, LLP

(57) ABSTRACT

The present invention relates to a broadband wireless access system, and more particularly, to a method for a mobile station to save power for prescribed duration without performing a paging procedure and apparatus therefor. According to one embodiment of the invention, a method of operating a DCR (deregistration with content retention) mode of a mobile station in a broadband wireless access system includes the steps of transmitting a registration request (AAI_REG-REQ) message to a base station and receiving a registration response (AAI_REG-RSP) message including an identifier for identifying the mobile station in association with connection information (AMS context) of the mobile station in a network including a base station from the base station.

15 Claims, 9 Drawing Sheets

METHOD OF DCR OPERATION IN A BROADBAND WIRELESS COMMUNICATION SYSTEM

This application claims the benefit of the Korean Patent Application No. P2010-0020740, filed on Mar. 9, 2010, which is hereby incorporated by reference as if fully set forth herein.

This application also claims the benefit of U.S. Provisional Application Ser. Nos. 61/180,883, filed on May 24, 2009, 61/238,197, filed on Aug. 30, 2009, 61/294,098, filed on Jan. 11, 2010, and 61/238,640, filed on Aug. 31, 2009, the contents of which are hereby incorporated by reference in their entirety.

BACKGROUND OF THE INVENTION

1. Field of the Invention

The present invention relates to a broadband wireless access system, and more particularly, to a method for a mobile station to save power for prescribed duration without performing a paging procedure and apparatus therefor.

2. Discussion of the Related Art

In the following description, an idle mode of a mobile station and a paging group are schematically explained.

First of all, when a mobile station moves in a radio link environment constructed with multiple base stations, an idle mode is an operation of supporting DL (downlink) broadcast traffic reception to be periodically performed without registration with a specific base station.

When a mobile station fails to receive traffic from a base station for predetermined duration, it is able to enter an idle mode for power saving. Having entered the idle mode, the mobile station receives a broadcast message (e.g., a paging message) sent by the base station in an available interval and is then able to determine whether to enter a normal mode or stay in the idle mode. Moreover, the mobile station in the idle mode performs a location update to inform a paging controller of its location.

An idle mode gives a benefit to a mobile station in a manner of eliminating a request for activation associated with a handover and general management requests. The idle mode puts limitation on mobile station activity in a manner of enabling a mobile station to perform a scan in a discrete cycle only. Therefore, the idle mode saves power and operational resources used by the mobile station.

An idle mode provides a simple and appropriate method of informing a mobile station of pending downlink traffic and removes a radio interface and network handover (HO) traffic from an inactive mobile station, thereby giving benefits to a network and a base station.

Meanwhile, a paging means a function of obtaining a location (e.g., a prescribed base station, a prescribed switching center, etc.) of a mobile station corresponding to an incoming signal occurrence in mobile communication. A plurality of base stations (BSs) supporting the idle mode can configure a paging area by belonging to a specific paging group.

In this case, the paging group indicates a logical group. The object of the paging group is to provide an adjacent range area that can be paged in downlink (DL) if there is a traffic targeting a mobile station (MS). Preferably, the paging group is large enough to enable a specific mobile station to exist within the same paging group for the most of time and is also small enough to enable a paging load to maintain an appropriate level.

A paging group can include at least one base station. And, one base station can be included in at least one or more paging groups. A paging group is defined by a management system. A paging group is able to use a paging group-action backbone network message. A paging controller manages a list of mobile stations in idle mode using a paging-announce message that is one of backbone network messages. And, the paging controller is able to manage initial paging of all base stations belonging to a paging group.

In order to increase a rate of successful paging, a mobile station is able to perform a location update procedure. In this case, a location update is an action of a mobile station to increase a hit rate of paging performed on a mobile station having entered an idle mode and indicates a procedure for a mobile station to report a newly entered location or region in moving into a new region. This location update procedure can be performed in a manner that a mobile station and a base station exchange a ranging request (RNG-REQ) message and a ranging response (RNG-RSP) message with each other.

In the following description, one example for a procedure for a mobile station to enter an idle mode and operate in the general IEEE 802.16 system is explained with reference to FIG. 1.

Referring to FIG. 1, first of all, a mobile station is able to send a deregistration request (hereinafter abbreviated DREG-REQ) message to a serving base station to enter an idle mode from a normal mode [S101].

Having received the DREG-REQ message, the serving base station can exchange information on the mobile station and information on itself with a paging controller. IN particular, the serving base station is able to inform the paging controller of a mobile station identifier of the mobile station entering an idle mode and a corresponding serving base station identifier. And, the paging controller is able to inform the serving base station of a paging group ID (PGID) or a paging controller ID (PCID). The paging group ID or the paging controller ID is usable in transmitting and receiving a paging message [S102].

Subsequently, the serving base station is able to transmit a deregistration command (hereinafter abbreviated DREG-CMD) to the mobile station. The serving base station is able to send a deregistration command (MOB_DREG-CMD) message to the mobile station in response to the deregistration request message. In this case, the deregistration command message can contain paging information therein. And, the paging information can include such a parameter as a paging cycle, a paging offset, a paging listen interval and the like. Moreover, the deregistration command message can further contain a paging controller ID and a paging group ID [S103].

Having received the DREG-CMD message from the serving base station, the mobile station checks that the idle mode entry request has been successfully granted and is then able to enter the idle mode. Based on the paging information carried on the MOB_DREG-CMD message, the mobile station is able to receive the paging message. In particular, the mobile station is able to monitor a radio channel during the paging listen interval to check whether there is a paging message to be delivered to itself. For the rest of time, the mobile station operates in a sleep mode or a radio turn-off mode to save power consumption [S104].

A call for the mobile station or an external packet can be inputted to the paging controller [S105].

The paging controller can correspondingly perform a paging procedure for detecting a mobile station. In doing so, the paging controller is able to deliver a paging announcement message to all the base stations within a paging group [S106].

Subsequently, each of the base stations having received the paging announcement message within the paging group can broadcast a paging advertisement (MOB_PAG-ADV) message to every mobile station managed by the corresponding base station [S107].

Having received the paging advertisement message from the serving base station, the mobile station checks the received message. If the mobile station is paged, the mobile station enters a normal mode and is then bale to perform communication with the serving base station [S108, S109].

However, in the general IEEE 802.16 based wireless communication system, a mobile station has to enter an idle mode to save power despite that a paging procedure is unnecessary. So, paging relevant information is unnecessarily allocated to the mobile station. Thus, although the mobile station in the idle mode needs not to receive a paging message, the mobile station should wake up to cope with a paging interval.

SUMMARY OF THE INVENTION

Accordingly, the present invention is directed to a method of DCR operation in a broadband wireless communication system that substantially obviates one or more problems due to limitations and disadvantages of the related art.

An object of the present invention is to provide a method for a mobile station to save power for prescribed duration without performing a paging procedure and apparatus therefore, by which the power can be efficiently saved.

Another object of the present invention is to provide a method of performing a network re-entry in a mode for power saving and apparatus therefore, by which the network re-entry can be efficiently performed.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of operating a DCR (deregistration with content retention) mode of a mobile station in a broadband wireless access system, according to the present invention includes the steps of sending a registration request (AAI_REG-REQ) message to a base station and receiving a registration response (AAI_REG-RSP) message including an identifier for identifying the mobile station in association with connection information (AMS context) of the mobile station in a network including a base station from the base station.

Preferably, the identifier is a context retention identifier (CRID).

More preferably, the registration response message is received when a network entry is performed on the base station or a zone switch from a region supporting a legacy mobile station of the base station to another region supporting an advanced mobile station further advanced than the legacy mobile station is performed.

In this case, the method further includes the steps of sending a first message including a first code indicating an entry request at the DCR mode to the base station, receiving a second message including a second code indicating whether to grant the entry request from the base station, and if the second code is set to a value indicating a grant of the entry request, operating in the DCR mode while a preset timer is valid.

Moreover, the first message is a deregistration request (AAI_DREG-REQ) message, the first code indicating the entry request is a deregistration request code (Deregistration_Request_Code) set to 0x04, the second message is a deregistration response (AAI_DREG-RSP) message, and the second code indicating the grant of the entry request is an action code set to 0x08.

In another aspect of the present invention, a method of operating a DCR (deregistration with content retention) mode of a base station in a broadband wireless access system, includes the steps of receiving a registration request (AAI_REG-REQ) message from a mobile station and sending a registration response (AAI_REG-RSP) message including an identifier for identifying the mobile station in association with connection information (AMS context) of the mobile station in a network including the base station to the mobile station.

Preferably, the identifier is a context retention identifier (CRID).

More preferably, the registration response message is received when a network entry is performed on the base station or a zone switch from a region supporting a legacy mobile station of the base station to another region supporting an advanced mobile station further advanced than the legacy mobile station is performed.

In this case, the method further includes the steps of receiving a first message including a first code indicating an entry request at the DCR mode from the mobile station, determining whether to grant the entry request, if the entry request is granted, delivering a context of the mobile station to a prescribed network entity, and sending a second message including a second code indicating a grant of the entry request to the mobile station.

Moreover, the first message is a deregistration request (AAI_DREG-REQ) message, the first code indicating the entry request is a deregistration request code (Deregistration_Request_Code) set to 0x04, the second message is a deregistration response (AAI_DREG-RSP) message, and the second code indicating the grant of the entry request is an action code set to 0x08.

In another aspect of the present invention, a mobile station, which operates in a broadband wireless access system, includes a processor and a radio communication (RF) module configured to transceive a radio signal externally under the control of the processor. In this case, the processor controls the wireless communication module to send a registration request (AAI_REG-REQ) message to a base station and to obtain an identifier for identifying the mobile station in association with connection information (AMS context) of the mobile station in a network including a base station via a registration response (AAI_REG-RSP) message received from the base station in response to the registration request message.

Preferably, the identifier is a context retention identifier (CRID).

More preferably, the registration response message is received when a network entry is performed on the base station or a zone switch from a region supporting a legacy mobile station of the base station to another region supporting an advanced mobile station further advanced than the legacy mobile station is performed.

In this case, the processor controls the wireless communication unit to send a first message including a first code indicating an entry request at the DCR mode to the base station. If a second message including a second code indicating whether to grant the entry request is received from the base station and if the second code is set to a value indicating a grant of the entry request, the processor controls to operate in the DCR mode while a preset timer is valid.

Moreover, the first message is a deregistration request (AAI_DREG-REQ) message, the first code indicating the entry request is a deregistration request code (Deregistration_Request_Code) set to 0x04, the second message is a deregistration response (AAI_DREG-RSP) message, and the second code indicating the grant of the entry request is an action code set to 0x08.

Accordingly, the present invention provides the following effects and/or advantages.

First of all, according to embodiments of the present invention, a mobile station is able to save power for a prescribed duration without performing a paging procedure.

Secondly, the present invention enables information for a quick network re-entry to be kept by a network entity, thereby performing a network re-entry efficiently.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
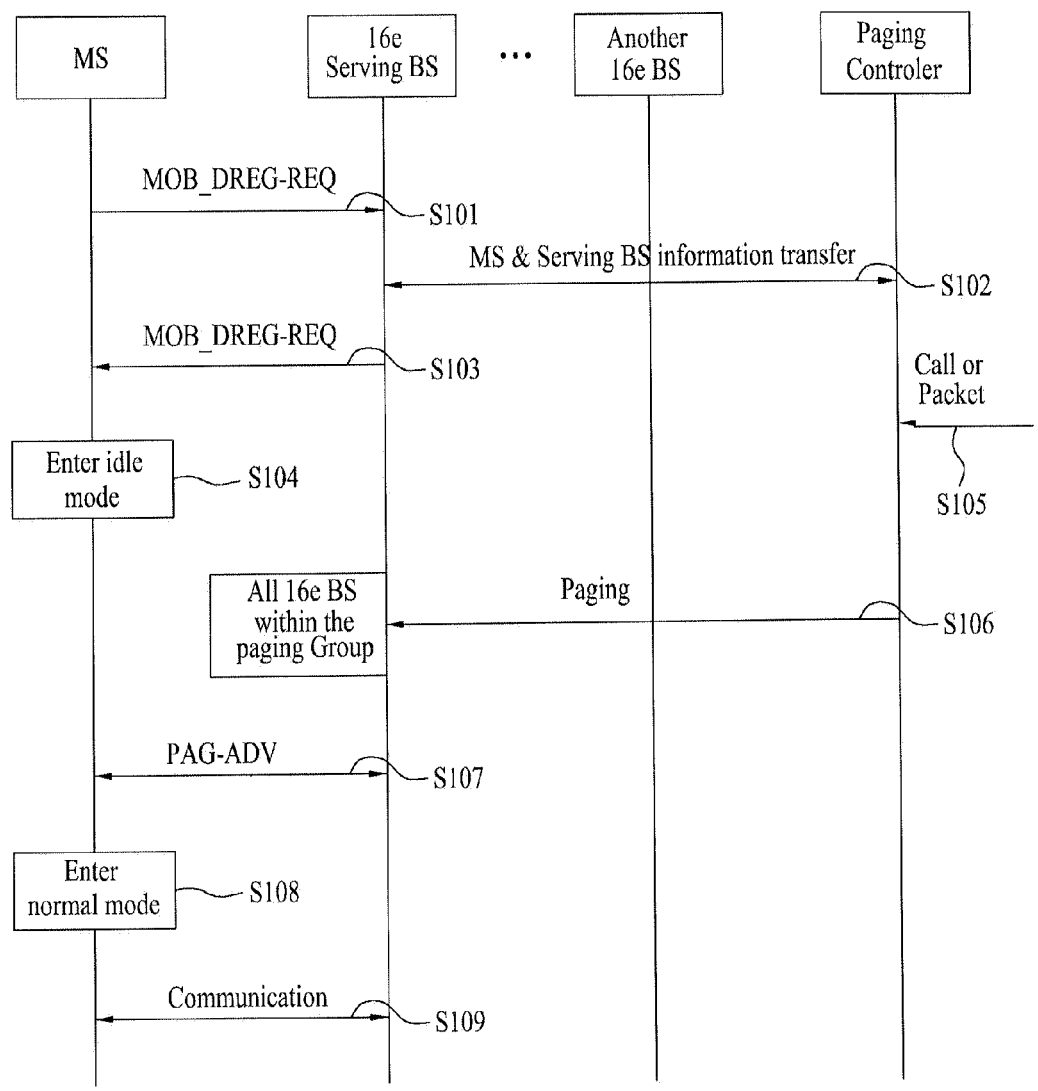
FIG. 1 is a diagram of one example for a procedure for a mobile station to enter an idle mode and operate in a general IEEE 802.16 system.

Reference will now be made in detail to the preferred embodiments of the present invention, examples of which are illustrated in the accompanying drawings. Wherever possible, the same reference numbers will be used throughout the drawings to refer to the same or like parts.

The present invention relates to a wireless access system. Reference will now be made in detail to a method of an efficient DCR mode operation according to various embodiments of the present invention, examples of which are illustrated in the accompanying drawings.

First of all, the following embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment.

In the description of drawings, procedures or steps, which may ruin the substance of the present invention, are not explained. And, procedures or steps, which can be understood by those skilled in the art, are not explained as well.

In exemplary embodiments of the present invention, a description is made of a data transmission and reception relationship between a BS and a Mobile Station (MS). Herein, the term 'BS' refers to a terminal node of a network, which communicates directly with the MS. In some cases, a specific operation described as performed by the BS may be performed by an upper node of the BS.

Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'eNode B (eNB)', 'access point', 'Advanced Base Station (ABS) etc. The term 'MS' may be replaced with the term 'User Equipment (UE)', 'Subscriber Station (SS')', 'Mobile Subscriber Station (MSS)', 'mobile terminal', 'Advanced Mobile Station (AMS)', etc.

A transmitter means a node that transmits voice or data service and a receiver means a node that receives voice or data service. Hence, an MS may be a transmitter and a BS may be a receiver, on an uplink. Likewise, the MS may be a receiver and the BS may be a transmitter, on a downlink.

Meanwhile, the MS may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, etc.

Exemplary embodiments of the present invention may be achieved by various means, for example, hardware, firmware, software, or a combination thereof.

In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the exemplary embodiments of the present invention may be implemented in the form of a module, a procedure, a function, etc. performing the above-described functions or operations. A software code may be stored in a memory unit and executed by a processor. The memory unit is located at the interior or exterior of the processor and may transmit and receive data to and from the processor via various known means.

Exemplary embodiments of the present invention are supported by standard documents disclosed for at least one of wireless access systems including an Institute of Electrical and Electronics Engineers (IEEE) 802 system, a $3^{rd}$ Generation Project Partnership (3GPP) system, a 3GPP Long Term Evolution (LTE) system, and a 3GPP2 system. In particular, the steps or parts, which are not described to clearly reveal the technical idea of the present invention, in the embodiments of the present invention may be supported by the above documents. All terminologies used herein may be supported by at least one of P802.16-2004, P802.16e-2005, P802.16Rev2 and p802.16m documents which are the standards of IEEE 802.16.

In the following description, specific terminologies are provided to help the understanding of the present invention. And, the use of the specific terminology can be modified into another form within the scope of the technical idea of the present invention.

In this disclosure, the following description is made on the assumption of IEEE 802.16 system. Specifically, a mobile station in the following description is assumed as an advanced mobile station (hereinafter abbreviated AMS) that meets the specifications defined by the IEEE 802.16m standard.

A DCR (deregistration with content retention) mode proposed by the present invention is explained as follows.

First of all, regarding the DCR mode, although a mobile station is deregistered with a network, while a resource retain time of prescribed duration is valid, its context is retained by a network entity. In this case, a timer for the resource retain time can be named a resource retain timer.

While the resource retain timer is valid, a network retains information required for a quick network re-entry of a mobile station. When a DCR mode is entered, a deregistration identifier (hereinafter abbreviated DID) is allocated to a mobile station together with a paging cycle and a paging offset. In this case, to be discriminated from a DID used for an idle mode, the allocated DID is set to identify mobile stations entering a DCR mode in a manner of setting a value of each of the paging cycle and the paging offset to 0 or allocating the DID only without allocating paging cycle and offset information. In this case, the allocated DID may differ from a mobile station identifier used in entering the idle mode. In order to identify a mobile station in DCR mode, a separate identifier (e.g., CRID: context retention identifier) different from the DID is usable. If the separate identifier different from the DID is used, the DID can be used to identify a mobile station in an idle mode only.

If the separate identifier different from the DID is used to identify a mobile station in DCR mode, the identifier can be used as an identifier for identifying a mobile station in a coverage loss state corresponding to a case that a mobile station is disconnected by deviating from coverage of a current base station as well as the DCR mode. In order to identify a mobile station in DCR mode or coverage loss state, when the separate identifier different from the DID is used, this identifier is generally called CRID. Yet, this name of CRID is just given for convenience and can be replaced by another name.

Meanwhile, in a network including at least one base station, CRID can be used to identify a mobile station in association with connection information (i.e., AMS context) of the mobile station. In case of a network entry, this CRID can be allocated to a mobile station in a manner of being contained in a registration response (AAI_REG-RSP) message in performing a zone switch from one zone (LZone), which supports a legacy mobile station (YMS, mobile station of IEEE 802.16e specification), into another zone (MZone) that supports an AMS in the IEEE 802.16m system. When a mobile station performs a network re-entry (e.g., a case of performing a handover, a case of returning from DCR mode, a case of performing a network re-entry in coverage loss state, etc.), the CRID can be updated via a ranging response (AAI_RNG-RSP) message.

First Embodiment

According to one embodiment of the present invention, a method for a mobile station to enter a DCR mode is provided.

In the following description, a method of entering a DCR mode in a state that a mobile station is connected to a network is explained with reference to FIG. 2.

Figure 2:
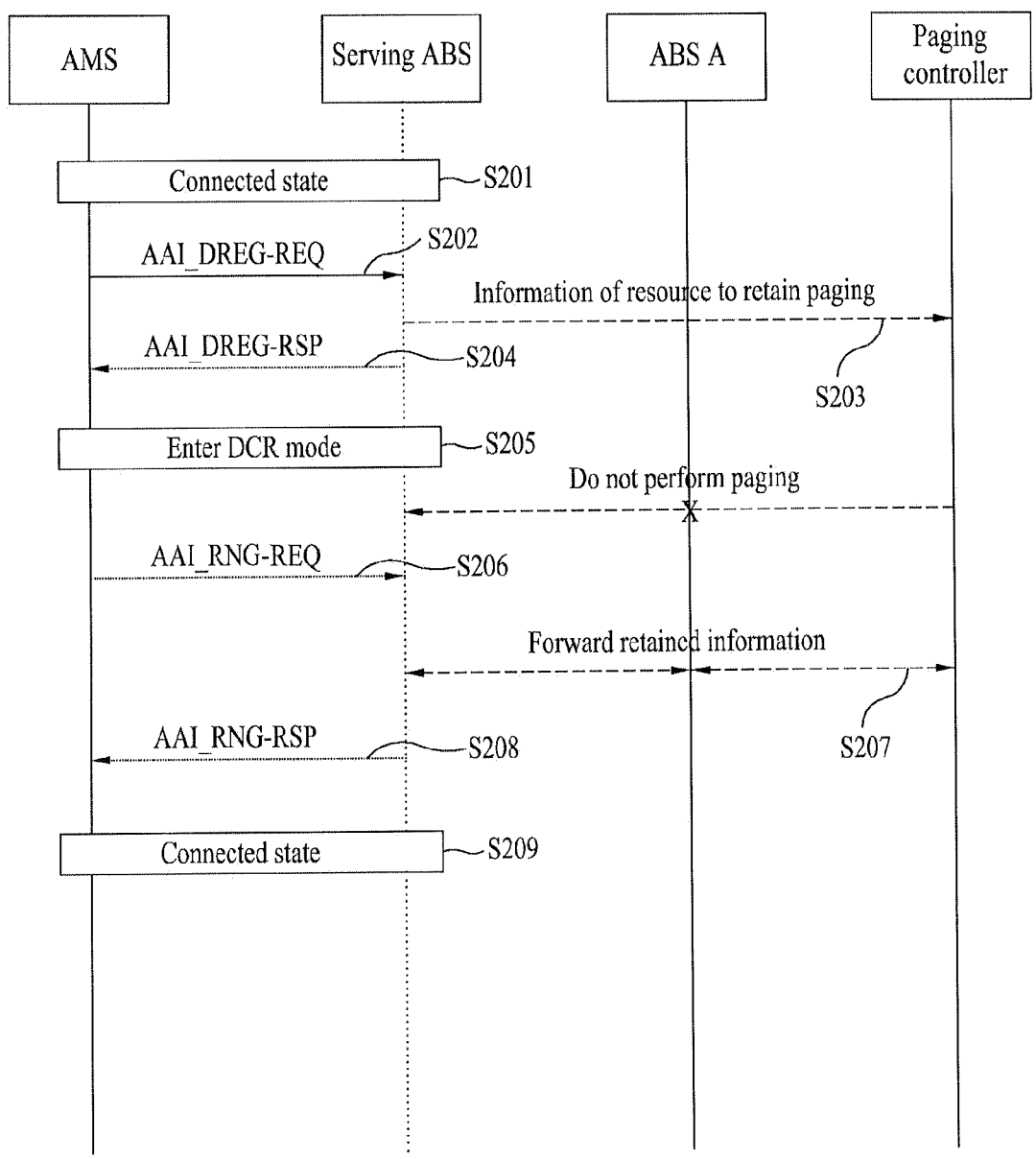
FIG. 2 is a diagram of one example for a DCR mode operation process of a mobile station according to one embodiment of the present invention.

FIG. 2 is a diagram of one example for a DCR mode operation process of a mobile station according to one embodiment of the present invention.

Referring to FIG. 2, while a mobile station connected to a serving base station is normally performing a data exchange, the mobile station may enter a DCR mode [S201].

For this, the mobile station is able to initiate the DCR mode in a manner of setting the DCR mode to a specific parameter value in a deregistration request (AAI_DREG-REQ) message and then sending the message to the serving base station [S202].

In this case, the specific parameter preferably includes a deregistration request code (Deregistration_Request_Code) field and its value can be set to 0x04.

In particular, regarding the parameter setting, a configuration of the deregistration request code transmitted via the AAI_DREG-REQ message can be classified into two types shown in Table 1.

Table 1 partially shows one example for a deregistration request message applicable to embodiments of the present invention.

TABLE 1

| De-registration_Request_Code (included in AAI_DREG-REQ) | Value |
|---|---|
| 0x04 | Request for AMS deregistration from serving ABS and initiation of deep idle mode for AMS hibernation. This mode is able to drop a packet when the packet (IP packet included) to AMS arrives at a network. |
| 0x05 | Request for AMS deregistration from serving ABS and initiation of deep idle mode for inter-RAT HO. This mode enables a packet to be forwarded to RAT in which MS is currently operating when the packet (IP packet included) to AMS arrives at a network. |

Referring to Table 1, in case that a deregistration request code is set to 0x04, a base station is able to drop a data packet for a corresponding mobile station. In case that a deregistration request code is set to 0x05, a base station is able to forward a data packet to a target RAT (radio access technology) base station. As an activity according to the code value 0x04 or 0x05 may vary in a network layer, it may be necessary to discriminate a request code. Yet, in case of a normal DCR mode entry, a deregistration request code value is preferably set to 0x04.

In this case, the mobile station is able to make a request for retain a specific service and operation information for the purpose of DCR mode management. For this, the specific service or operation information, which is requested to be retained, is included as a format of DCR mode retain information element. In this case, the DCR mode retain information element can be equal to or different from an idle mode retain information element.

In case that the serving base station grants the DCR mode entry request made by the mobile station, the serving base station is able to forward the information retain-requested by the mobile station to a network entity (in this case, a paging controller or an authenticator ASN GW) [S203].

Moreover, the serving base station sets an action code to a specific value in a deregistration response message (AAI_DREG-RSP) and sends the AAI_DREG-RSP message to the mobile station [S204].

In this case, each value of the action code included in the deregistration response message is illustrated in Table 2.

TABLE 2

| Action Code (included in AAI_DREG-RSP) | Value |
| --- | --- |
| 0x00 | AMS shall immediately terminate service with the ABS and should attempt network entry at another ABS. |
| 0x01 | AMS shall listen to the current ABS but shall not transmit until a RES-CMD message or AAI_DREG-RSP message with action code 0x02 or 0x03 is received. |
| 0x02 | AMS shall listen to the current ABS but only transmit on the basic and primary management flows. |
| 0x03 | AMS shall return to normal operation and may transmit on any of its active connections. |
| 0x04 | This option is valid in response to a AAI_DREG-REQ message with De-Registration Request Code = 0x00. The AMS shall terminate current Normal Operation with the ABS. |
| 0x05 | AMS shall begin idle mode initiation: a) to signal AMS to begin idle mode in unsolicited manner or b) to allow AMS to transmit AMS-initiated idle mode request at the REQ-Duration expiration |
| 0x06 | This option is valid only in response to a AAI_DREG-REQ message with De-Registration Code 0x01: a) to reject AMS-initiated idle mode request or b) to allow AMS to transmit AMS-initiated idle mode request at the REQ-Duration expiration |
| 0x07 | This option is valid only in response to an AAI_DREG-REQ message with De-Registration Request Code 0x01 to allow AMS-initiated idle mode request |
| 0x08 | This option is valid only in response to an AAI_DREG-REQ message with De-Registration Request Code 0x04 to allow retention of the AMS's connection information |
| 0x09 | This option is valid only in response to an AAI_DREG-REQ message with De-Registration Request Code 0x04 to reject retention of the AMS's connection information. |

Referring to Table 2, since the specific value corresponds to a case of allowing the connection information retention of the mobile station for the deregistration request code 0x04 of the mobile station, it is preferably set to 0x08. In this case, if the mobile station attempts a network re-entry in the DCR mode, an identifier for identifying the mobile station can be included. If the identifier is used like the DID used for the idle mode, all paging information (i.e., a paging cycle, a paging offset, etc.) is set to '0' or 'null'. If the identifier is not included in the deregistration response message, it should be indicated that the DID included in the deregistration response message is the identifier used in the DCR mode.

If a separate identifier different from the DID is used as the identifier, CRID corresponding to the separate identifier can be included in the deregistration response message. In case that the CRID is used, it can be allocated via a registration response message (AAI_REG-RSP) in a network entry or re-entry procedure before a DCR mode entry or via a deregistration response message. In case that the CRID is used, the CRID can be configured in a manner that a DID is combined with one or more bits indicating paging information set to 0 or that a 1- or 2-bit identifier indicating whether to be used in DCR mode is added to a DID. This identifier shall be described in detail later.

A specific service or operation information, which can be retained as a DCR mode retain information element) in response to information retention-requested by the mobile station, can be included in the deregistration response message. In this case, the DCR mode retain information element may be equal to or different from an idle mode retain information element.

Moreover, an identifier (e.g., a paging controller identifier (PCID), an authenticator network entity ID, etc.) of a network entity, which keeps the information retention-requested by the mobile station, can be further included in the deregistration response message.

If the serving station rejects the DCR mode entry request made by the mobile station, it is able to send the deregistration response message to the mobile station in a manner of setting an action code of the deregistration response message to 0x09 that is a value that instructs a rejection of a context retention of the mobile station.

Meanwhile, having received the deregistration response message from the serving base station, the mobile station is able to operate in the DCR mode [S205].

While the mobile station is operating in the DCR mode, the mobile station and the base station basically do not perform any data exchange including a paging procedure except a case that the mobile station makes a request for a network re-entry in the DCR mode or a request for an extension of a resource retention time.

Afterwards, the mobile station is able to send a ranging request message to the base station to enter a normal mode from the DCR mode [S206].

In doing so, in order to indicate that the DCR mode operation is terminated, the mobile station is able to set a ranging purpose code of the ranging request message to a specific value. Values of the settable ranging purpose codes are described with reference to Table 3 as follows.

TABLE 3

| | | |
|---|---|---|
| Ranging Purpose Indication | The presence of this item in the message indicates the following AMS action: If Bit#0 is set to 1, it indicates that the AMS is currently attempting HO reentry, or, in combination with a Paging Controller ID, indicates that the MS is attempting network reentry from idle mode to the BS. In this case, Bit#1 shall be 0. If Bit#1 is set to 1, it indicates that the AMS is initiating the idle mode location update process, or, in combination with CRID, it indicates that the AMS is initiating DCR mode extension. In this case, Bit#0 shall be 0. If Bit#2 is set to 1, ranging request for emergency call setup. When this bit is set to 1, it indicates AMS action of Emergency Call process. If Bit#4 is set to 1, it indicates that the AMS is attempting to perform location update due to a need to update service flow management encodings for E-MBS flows. If Bit#5 is set to 1, it indicates that AMS is initiating location update for transmission to DCR mode from idle mode. If Bit#6 is set to 1 in combination with ID of the network entity that assigns/retains the context, it indicates that the AMS is currently attempting reentry from DCR mode. If Bit#7 is set 1, it indicates that the AMS is currently attempting network reentry after experiencing a coverage loss. If Bit#8 is set to 1, it indicates that the AMS is currently attempting network reentry from a IEEE802.16e only Legacy BS | It shall be included when the AMS is attempting to perform reentry. HO, location update or DCR mode extension. |

Referring to Table 3, the mobile station sets a ranging purpose field to 0x06 that is the bit indicating a network re-entry in DCR mode. And, an identifier of a network entity, which keeps the information retention-requested by the mobile station, a DID (or CRID), a base station identifier (BSID) at the time of the mobile station's entry at the DCR mode and the like can be included in a ranging request message by the mobile station.

Preferably, the transmission of the ranging request message is performed prior to expiration of a resource retain timer. The information retention-requested by the mobile station is kept in the network entity until the expiration of the resource retain timer. This is because the DCR mode is terminated according to the expiration of the resource retain timer. In consideration of this situation, the mobile station is able to attempt a network re-entry at any time until the expiration of the resource retain timer. If any action is not taken until the termination of the DCR mode due to the expiration of the resource retain timer, the mobile station may be able to perform an initial network entry.

In order to extend the DCR mode before the expiration of the resource retain timer, if a ranging request message, in which a corresponding ranging purpose code is set, is sent to the base station, the resource retain timer can be extended. In particular, the DCR mode can be extended in the following manner. First of all, by setting the ranging purpose code to 1 and having a CRID included in a ranging request message, the mobile station sends the ranging request message to the base station.

Although the mobile station is described in the present embodiment as attempting the network re-entry at the serving base station at that time of entering the DCR mode, the mobile station is able to attempt a network re-entry at another base station as well.

Accordingly, the serving base station is able to obtain information on the mobile station kept by the corresponding network entity [S207].

The following steps including a step S208 are similar to those of a network re-entry procedure in a general idle mode. For clarity, details of the following steps next to the step S207 shall be omitted from the following description.

Meanwhile, according to another example of the present embodiment, a mobile station is able to enter a DCR mode from an idle mode. This is explained with reference to FIG. 3 as follows.

Figure 3:
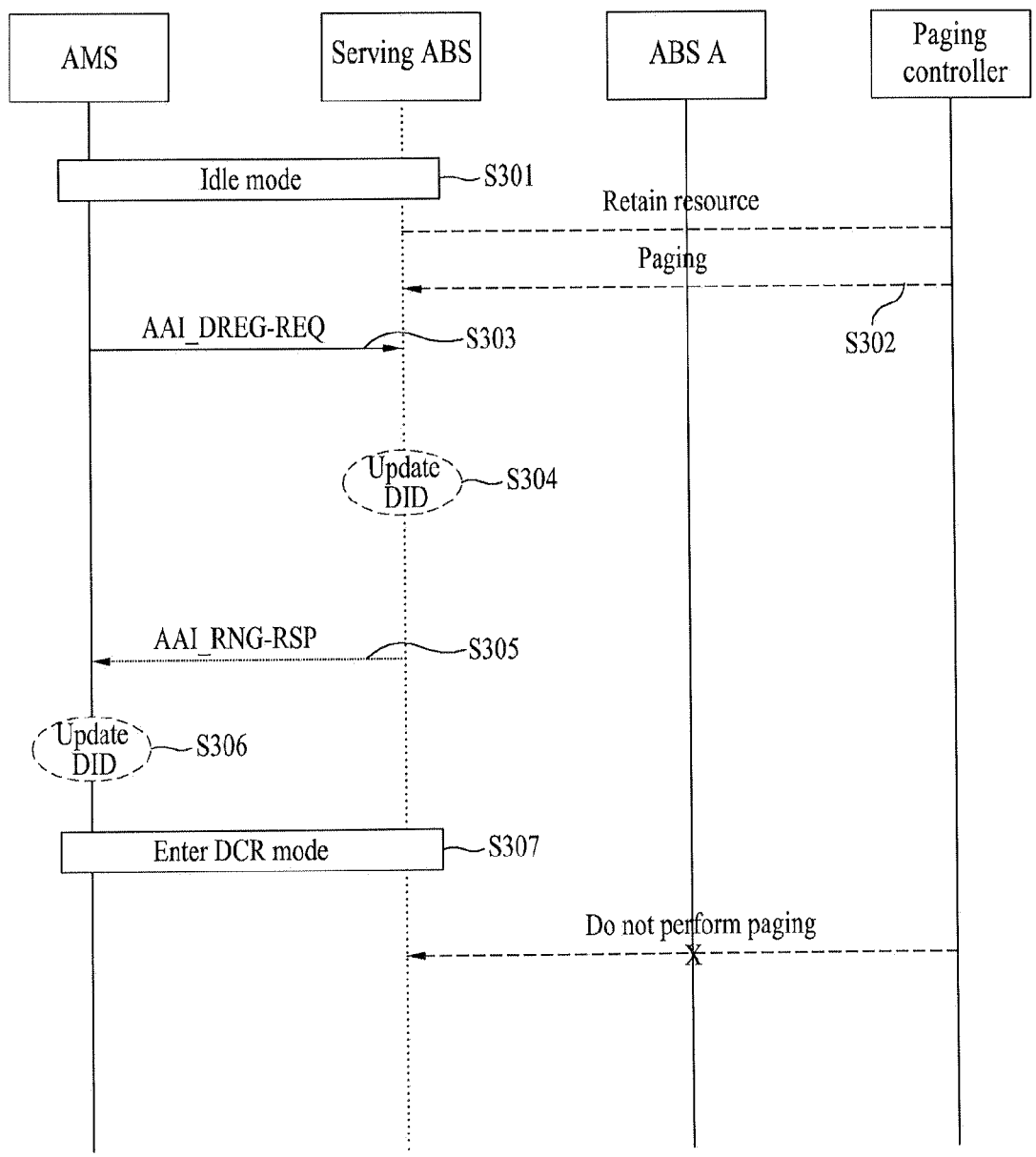
FIG. 3 is a diagram of one example for an operational process for a mobile station to enter a DCR mode from an idle mode according to one embodiment of the present invention.

FIG. 3 is a diagram of one example for an operational process for a mobile station to enter a DCR mode from an idle mode according to one embodiment of the present invention.

Referring to FIG. 3, assume that a mobile station operates in idle mode. And, assume that information on the mobile station is retained by a paging controller in case of an idle mode entry [S301].

The mobile station is able to receive a paging message according to paging information (e.g., a paging cycle, a paging offset, etc.) allocated when the idle mode was entered [S302].

In this case, the mobile station is able to perform a location update to enter a DCR mode from the idle mode. For this, the mobile station is able to send a ranging request (AAI_RNG-REQ) message to a serving base station [S303].

In doing so, in order to indicate a DCR mode entry, the mobile station preferably sets a ranging purpose code of the ranging request message to 0x05 indicating the DCR mode entry from the idle mode.

When a CRID is used as an identifier for identifying a mobile station in DCR mode, if a base station grants a DCR entry request made by the mobile station, the mobile station starts to operate in the DCR mode after the grant.

When a DID is used as an identifier for identifying a mobile station in DCR mode, if a base station grants a DCR entry request made by the mobile station, the base station is able to update a DID of the corresponding mobile station [S304]. In particular, a DID equal to or different from the former DID allocated to the mobile station in the idle mode is allocated and paging information is not included or can be set to '0' or 'null'. If paging information is included in the DID, all bit corresponding to the paging information can be set to 0 and an identifier of a network entity, which keeps information on the mobile station, is usable for the update of DID. In case that a DCR mode mobile station identifier different from a mobile station identifier received in case of the idle mode entry is allocated, the step S304 is not executed. And, a DCR mode mobile station identifier of a new type is delivered by being included in a ranging response message. This identifier of the new type is allocated irrespective of the paging information.

In order to inform the mobile station of the DCR mode grant, the base station sends a ranging response (AAI_RNG-RSP) message in which an action code of a location update response is set to 0x04 [S305].

Accordingly, the mobile station is able to operate in the DCR mode [S306, S307]. As the mobile station operates in the DCR mode, the mobile station does not receive a paging message.

As the mobile station operates in the DCR mode, a network entity (e.g., authenticator ASN_GW), which keeps retention request information of the mobile station, retains the corresponding information while a resource retain timer is valid.

In this case, as mentioned in the foregoing description, the update of DID is performed by each of the mobile station and the base station at a different timing point or the DID can be simultaneously updated by both of the mobile station and the base station as soon as the DCR mode is initiated. The DID updates of the mobile and base stations may be performed to enable the mobile station, the base station and the network to clearly recognize the switch to the DCR mode that does not require a paging procedure. The DID update can be implicitly performed by each of the mobile station and the base station according to a prescribed rule or can be explicitly notified to the mobile station by the base station via the ranging response message.

In case that the base station rejects the DCR mode entry of the mobile station, the base station is able to sent the ranging response message in the step S305 to the mobile station in a manner of setting an action code of a location update response thereof to 0x05.

Meanwhile, according to a further example of the present embodiment, a method for a mobile station to enter an idle mode from a DCR mode is provided. This is described with reference to FIG. 4 as follows.

Figure 4:
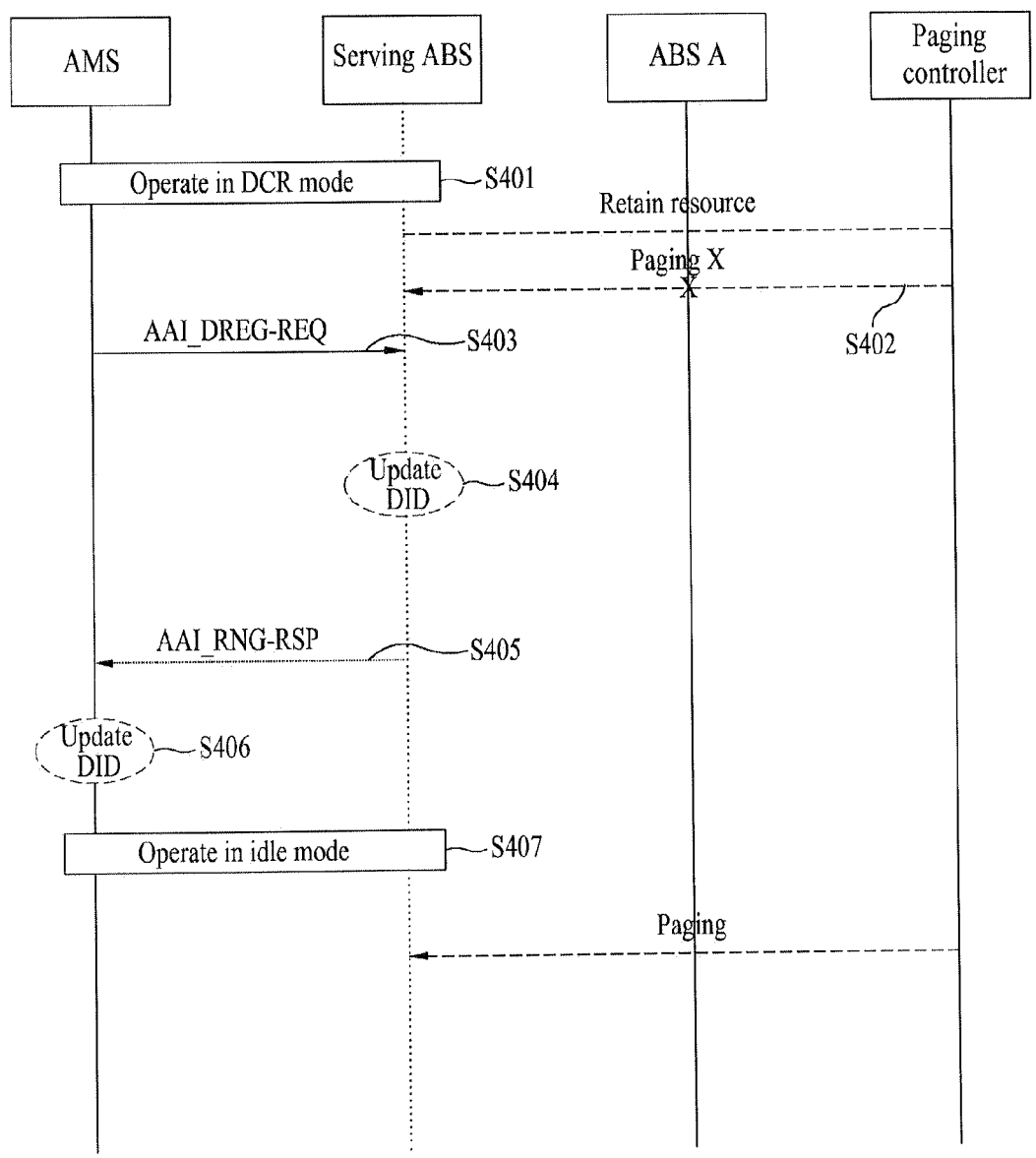
FIG. 4 is a diagram of one example for an operational process for a mobile station to enter an idle mode from a DCR mode according to one embodiment of the present invention.

FIG. 4 is a diagram of one example for an operational process for a mobile station to enter an idle mode from a DCR mode according to one embodiment of the present invention.

Referring to FIG. 4, assume that a mobile station operates in a DCR mode. And, assume that information on the mobile station is retained by such a prescribed network entity as a paging controller, an authenticator ASN-GW and the like [S401].

As the mobile station operates in the DCR mode, the mobile station does not receive a paging message [S402].

In order to enter an idle mode from the DCR mode, the mobile station is able to perform a location update. As a means for performing the location update, the mobile station is able to send a ranging request (AAI_RNG-REQ) message to a serving base station [S403].

In doing so, in order to indicate an idle mode entry request, it is preferable that a ranging purpose code of the ranging request message is newly defined.

When a base station grants the idle mode entry request made by the mobile station, in case that a CRID is used as an identifier for identifying the mobile station in the DCR mode, a DID for identifying the mobile station in the idle mode and information (e.g., a paging cycle, a paging offset, a PCID, etc.) corresponding to paging information are included in a ranging response message and the base station can send the ranging response message to allocate the DID and the information. When a Did is used as an identifier for identifying the mobile station in the DCR mode, in case that a previous DOD is identically used in the idle mode, it is able to send a ranging response message including information (e.g., a paging cycle, a paging offset, a PCID, etc.) corresponding to paging information only. In case that a DID different from the DID used in the DCR mode is used, it is able to send a ranging response message including a newly allocated DID and information (e.g., a paging cycle, a paging offset, a PCID, etc.) corresponding to paging information only.

Subsequently, the base station is able to send a ranging response message as a location update response to the mobile station in response of the location update [S405].

Preferably, a location update response code is set as the location update response to a value, which indicates that the idle mode entry from the DCR mode is granted, in the sent ranging response message. Since the indicating value is not currently defined, the present invention proposes to modify the setting of the ranging response message into Table 4.

TABLE 4

| Name (in AAI_RNG-RSP) | Value | Usage |
|---|---|---|
| Location Update Response | 0x00 = Success of Location Update<br>0x01 = Failure of Location Update<br>0x02 = Reserved<br>0x03 = Success of location update and DL traffic pending<br>0x04 = Allow AMS's DCR mode request<br>0x05 = Reject AMS's DCR mode request<br>0x06 = Allow AMS's Idle mode request from DCR mode<br>0x07~0xFF: Reserved | It shall be included when an ABS sends an AAI_RNG-RSP message in response to an AAI_RNG-REQ message used to perform location update |

Referring to Table 4, the base station is preferably set a location update response code to 0x06 to grant the idle mode entry of the mobile station.

Accordingly, the mobile station updates the DID and is then able to operate in the idle mode [S406, S407]. Afterwards, the mobile station is able to receive a paging message forwarded to itself according to the paging information.

Second Embodiment

According to another embodiment of the present invention, a method for a mobile station to terminate a DCR mode and perform a network re-entry is provided.

For this, the present embodiment proposes three kinds of methods for performing a network re-entry.

First Method: Using a CRID and a ranging purpose indicator allocated via a registration response message in case of a DCR mode entry or a network entry, it is able to perform a network re-entry.

Second Method: Normal initial entry procedure can be performed.

Third Method: In case that a femto base station has a unified ranging channel structure (i.e., like a macro bandwidth channel structure, if both a ranging preamble and a quick access message are transmitted together), it is able to indicate a network re-entry using a 1-bit indication of a bandwidth quick message. In this case, the 1-bit indication can be represented as a ranging purpose indicator. And, band request size information (BR size: 2 bits) for sending a ranging request message can be contained in a ranging preamble.

First of all, the first method is explained with reference to FIG. 5.

Figure 5:
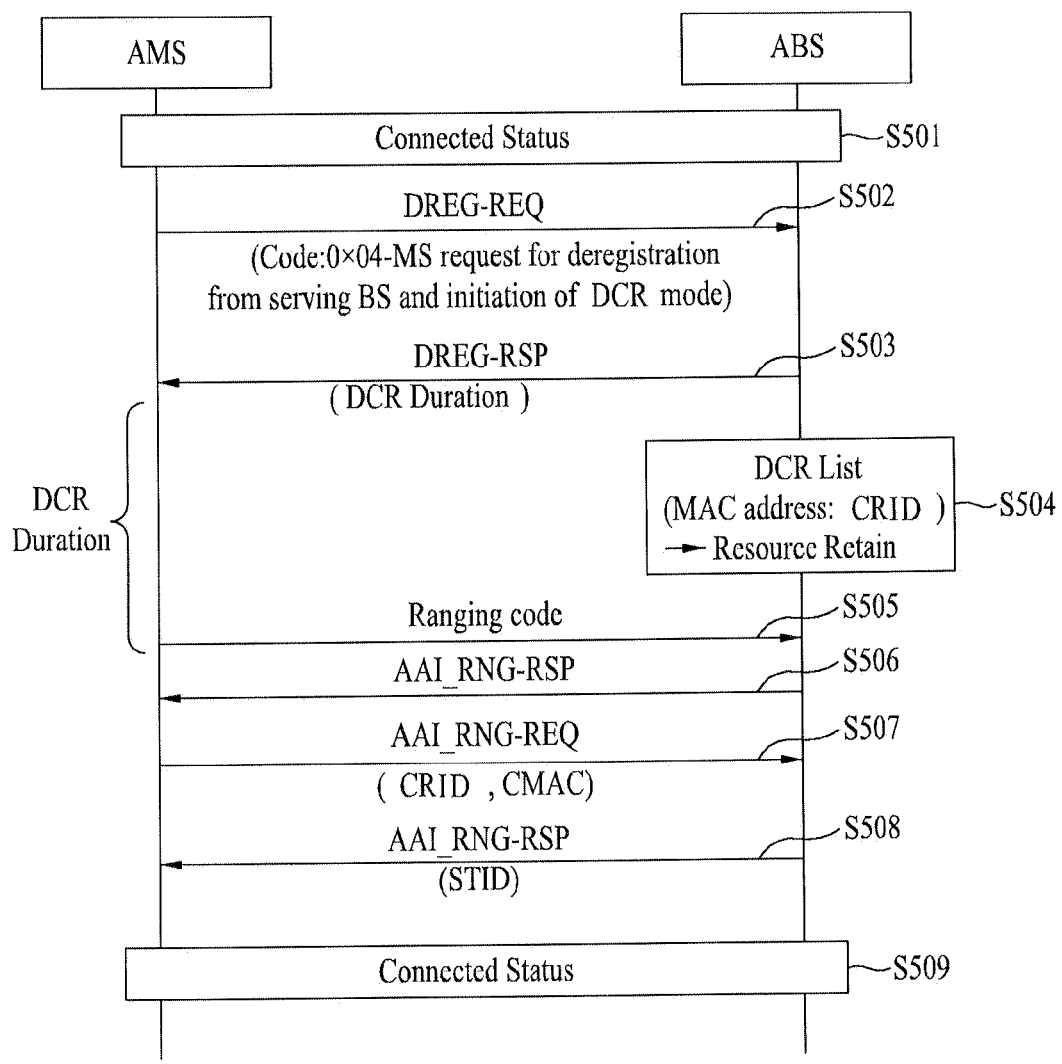
FIG. 5 is a diagram of one example for an operating process for a mobile station operating in DCR mode to perform a network re-entry according to another embodiment of the present invention.

FIG. 5 is a diagram of one example for an operating process for a mobile station operating in DCR mode to perform a network re-entry according to another embodiment of the present invention.

Referring to FIG. 5, a mobile station in a state connected to a base station can determine whether to enter a DCR mode [S501].

The mobile station sets a deregistration request code (Deregistration_Request_Code) of a deregistration request message to 0x04 and is then able to send the deregistration request message to the base station [S502].

Meanwhile, in response to the deregistration request message, the base station is able to sent a deregistration response message including a resource retain timer information to the mobile station [S503].

In this case, an identifier (i.e., CRID) for identifying the mobile station in the DCR mode is allocated to the mobile station via a registration response (AAI_REG-RSP) message or is newly allocated via a deregistration response (AAI_D-REG-RSP) message or a ranging response (AAI_RNG-RSP) message.

A network including the base station retains information on the mobile station and manages a list indicating information on a mapping relation between the CRID allocated to the mobile station and a medium access control (MAC) address [S504].

Afterwards, the mobile station terminates the DCR mode and is then able to transmit a ranging sequence (e.g., a CDMA ranging code) for attempting a network re-entry to the base station. In response to the ranging sequence, the base station transmits a success or failure of ranging, a physical parameter correction value and the like to the mobile station via a ranging response or ranging acknowledgement (AAI_RNG-ACK) message [S505, S506].

Accordingly, the mobile station sends a ranging request message to the base station in a manner that a CRID and a cipher based message authentication code (CMAC Tuple) for authentication are included in the ranging request message [S507].

In doing so, the mobile station is able to set a ranging purpose code to 0x06 in the ranging request message.

Subsequently, in response to the ranging request message, the base station sends a ranging response message to the mobile station in a manner that a station identifier (STID) or a temporary station identifier (T-STID) to be used for the base station by the mobile station is included in the ranging response message [S508]. In doing so, if the CMAC Tuple transmitted by the mobile station is valid, the base station ciphers the ranging request message and is then able to securely deliver the STID to the mobile station. On the contrary, if the T-STID is included, the base station is able to allocate the STID to the mobile station via an unsolicited ranging response (unsolicited AAI_RNG-RSP) message in addition [not shown in the drawing].

Afterwards, the mobile station completes the network re-entry procedure and is then able to perform normal data exchange in a state connected to the base station [S509].

In the following description, the second method is explained with reference to FIG. 6.

Figure 6:
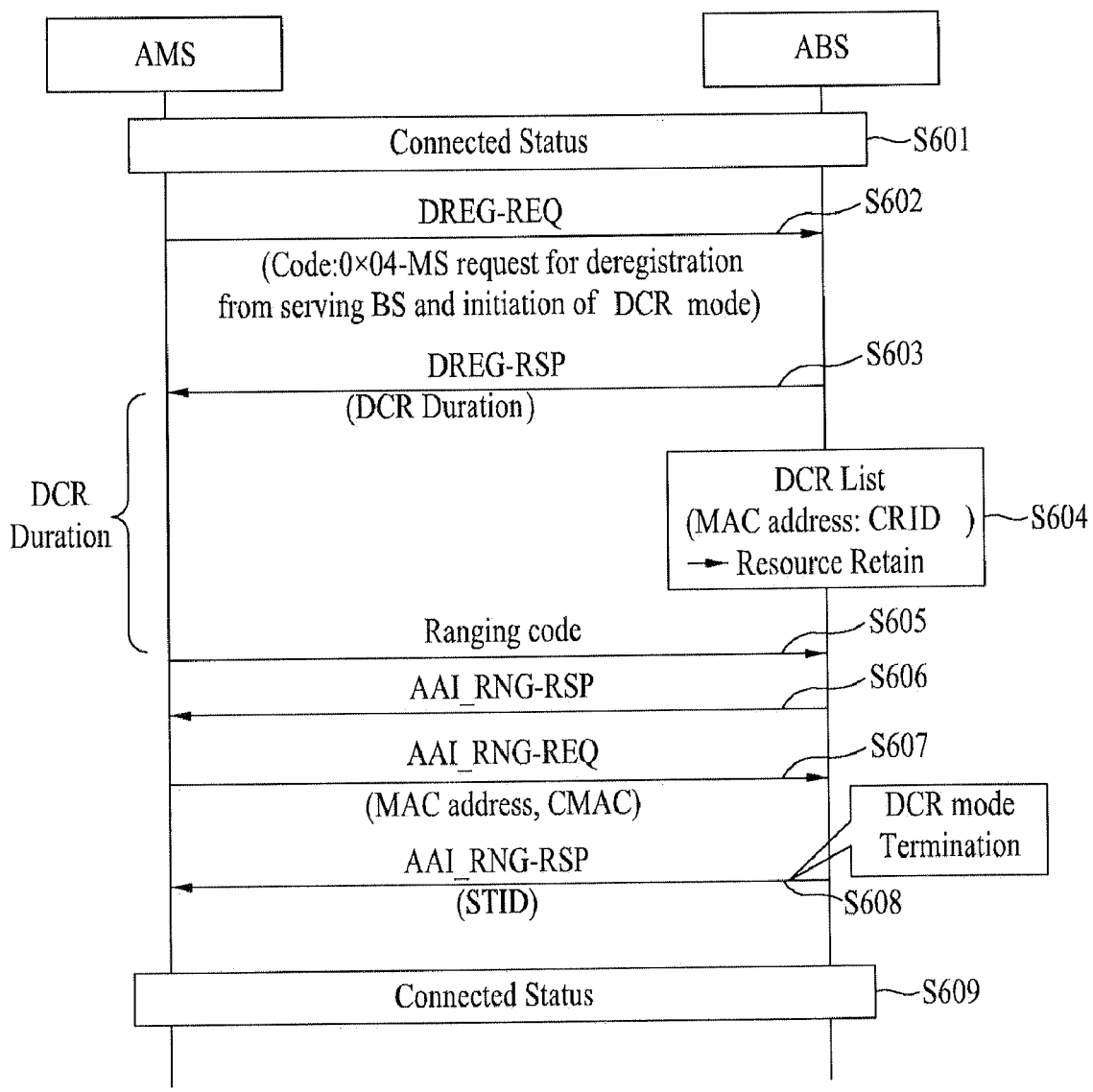
FIG. 6 is a diagram of another example for an operating process for a mobile station operating in DCR mode to perform a network re-entry according to another embodiment of the present invention.

FIG. 6 is a diagram of another example for an operating process for a mobile station operating in DCR mode to perform a network re-entry according to another embodiment of the present invention.

Referring to FIG. 6, as the steps shown in FIG. 6 are mostly similar to those shown in FIG. 5, description of the redundant parts is omitted for clarity of this disclosure but the differences in-between are described as follows.

First of all, in a step S603, a base station does not allocate a CRID to a mobile station. Therefore, in a step S604, a network including the base station identifies the retained information of the mobile station using a MAC address of the mobile station only instead of information on mapping the CRID and the MAC address to each other.

In a step S607, the mobile station sends a ranging request message in a manner that its MAC address is included in the ranging request message instead of the CRID. Subsequently, the base station is able to receive the corresponding information from a network entity, which keeps the information on the mobile station, using the MAC address of the mobile station.

The third method is described as follows.

Figure 7:
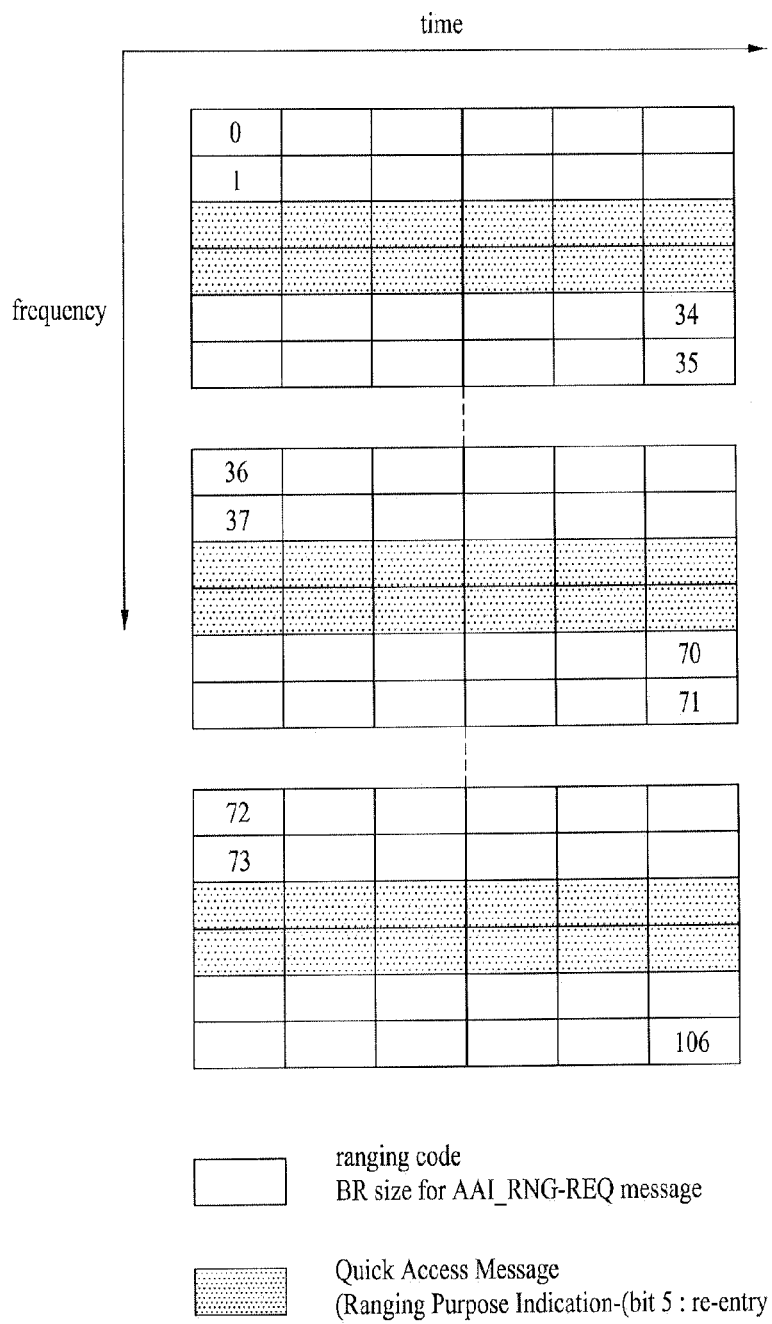
FIG. 7 is a diagram of one example for a unified ranging channel structure.

First of all, as mentioned in the foregoing description, the third method is applicable if a ranging channel structure of a base station is a unified ranging channel structure capable of transmitting a ranging preamble and a quick access message together like a macro bandwidth channel structure. One example for the unified ranging channel structure is shown in FIG. 7.

Thus, if the unified ranging channel is applied, the bandwidth quick access message can indicate that the mobile station is the mobile station that attempts a network re-entry in a DCR mode using 1-bit indicator. Moreover, a size of a bandwidth (BR size) for transmitting a ranging request message can be indicated via a ranging preamble using 2 bits. In the following description, when a unified ranging channel is supported, a network re-entry procedure of a mobile station is described with reference to FIG. 8.

Figure 8:
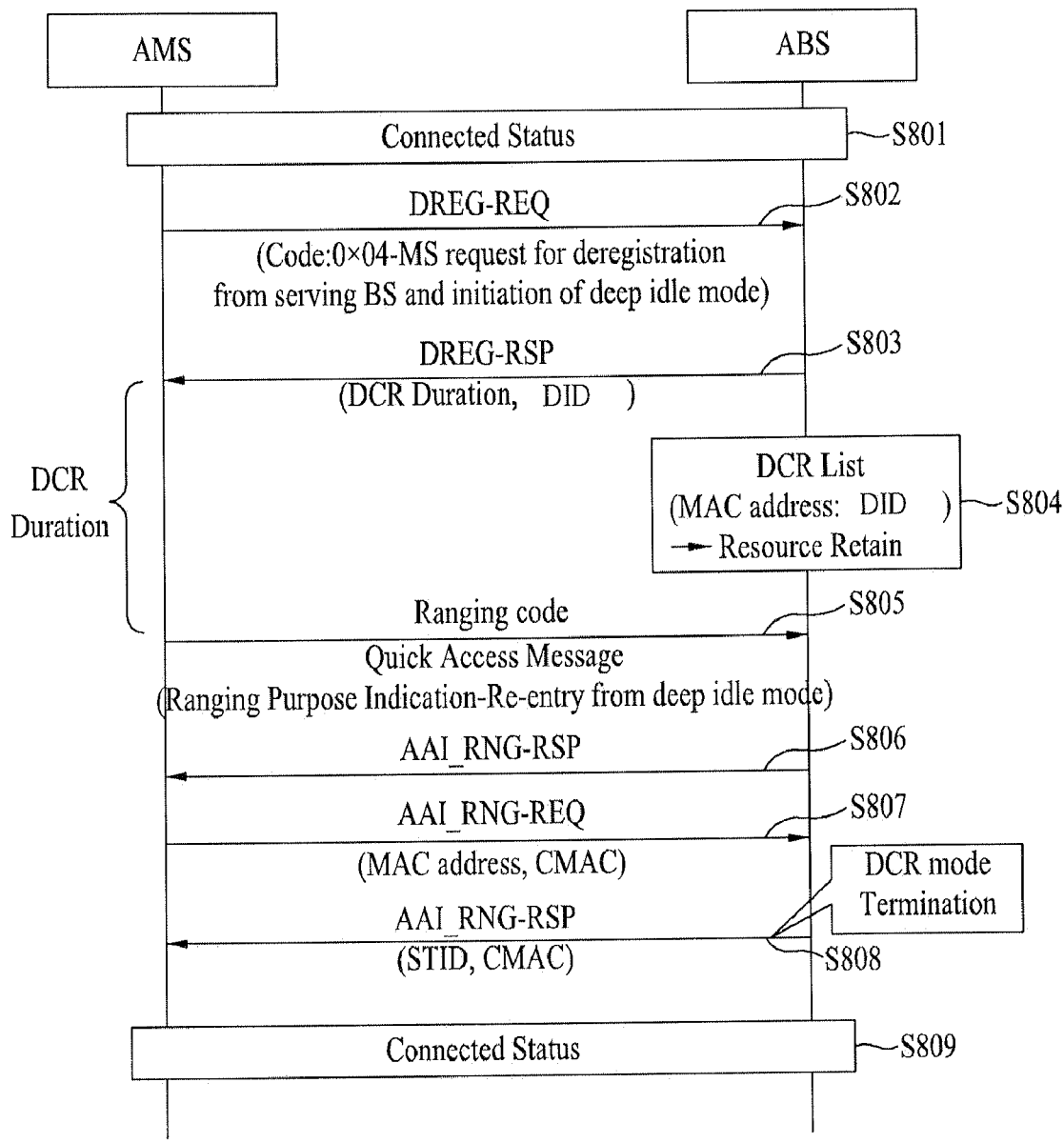
FIG. 8 is a diagram of a further example for an operating process for a mobile station operating in DCR mode to perform a network re-entry according to another embodiment of the present invention.

FIG. 8 is a diagram of a further example for an operating process for a mobile station operating in DCR mode to perform a network re-entry according to another embodiment of the present invention.

Referring to FIG. 8, as steps S801 to S804 are similar to the former steps S601 to S604 shown in FIG. 6, description of redundant parts is omitted from the following.

First of all, a mobile station is able to send a quick access message to a base station together with a ranging preamble (code) to perform a network re-entry from a DCR mode [S805].

In doing so, the mobile station is able to indicate a mobile station that performs a network re-entry from the DCR mode via a ranging purpose indication. Moreover, the mobile station is able to transmit a bandwidth size (size including a MAC address and a CMAC) for a ranging request (AAI_RNG-REQ) message to transmit together with a preamble.

The rest of steps in FIG. 8 are similar to those in FIG. 6 and their descriptions are omitted from the following.

Third Embodiment

According to a further embodiment of the present invention, an identifier (i.e., CRID) for identifying a mobile station in a DCR mode is allocated to be discriminated from a DID for identifying the mobile station in an idle mode. Types of CRID for the discrimination are proposed as follows.

Type 1: Bit(s) Added to DID to Identify DCR Mode

Generally, CRID can be configured in a manner that 1 or 2 bits are added to 10-bit MSB (most significant bits) or LSB (least significant bits) of DID for identifying a mobile station in an idle mode.

If 1 bit is added, it is able to indicate whether this identifier is used in the DCR mode only. If 2 bits are added, it is able to also indicate whether the DCR mode is the mode for the purpose (e.g., power saving (hibernation)) of the DCR mode or the mode for accessing another wireless system (inter-RAT).

Type 2: Paging Cycle and Paging Offset Included in Prescribed Identifier Bit

First of all, irrespective of DID, CRID can be configured in a manner that identifier bit of a prescribed length is combined with bit (e.g., 4 bits) indicating a paging cycle and bit (e.g., 4 bits) indicating a paging offset.

In this case, if at least one of the paging cycle and the paging offset is set to a specific value, it is able to indicate that it is applied to a DCR mode. If at least one of the paging cycle and the paging offset is set to a value different from the specific value, it is able to actually indicate a value of the paging cycle or the paging offset. Moreover, the paging cycle bits and the paging offset bits can indicate whether to be applied to the DCR mode in one body.

Type 3: Setting Paging Cycle Bits of DID Used for Idle Mode to Specific Value

First of all, MSB 4 bits of DID used for idle mode indicate a paging cycle. If theses bits indicating the paging cycle are set to a specific value e.g., 0x0000), this can be used as a CRID for identifying DCR-mode mobile station. In particular, the DID having the MSB set to a specific value can be allocated as the CRID to the mobile station in the DCR mode only.

Type 4: Identifier bits of network entity, which retains context information of MS, to DID First of all, CRID can be configured in a manner that at least one of bits of an identifier (e.g., authenticator ASN-GW) of a network entity, which retains context information of DCR-mode mobile station, is added to 10-bit MSB or LSB of DID.

Besides, the above described configuration of the CRID according to the present embodiment is applicable to the aforesaid first and second embodiments.

Structures of Mobile Station and Base Station

In the following description, a mobile station and base stations (FBS, MBS) according to another embodiment of the present invention for implementing the above described embodiments of the present invention are explained.

First of all, a mobile station works as a transmitter in uplink and is able to work as a receiver in downlink. A base station works as a receiver in uplink and is able to work as a transmitter in downlink. In particular, each of the mobile station and the base station can include a transmitter and a receiver for transmission of information and/or data.

Each of the transmitter and the receiver can include a processor, a module, a part and/pr a means for performing embodiments of the present invention. In particular, each of the transmitter and the receiver can include a module (means) for encrypting a message, a module for interpreting the encrypted message, an antenna for transceiving the message and the like. Examples of these transmitting and receiving sides are explained with reference to FIG. 9 as follows.

Figure 9:
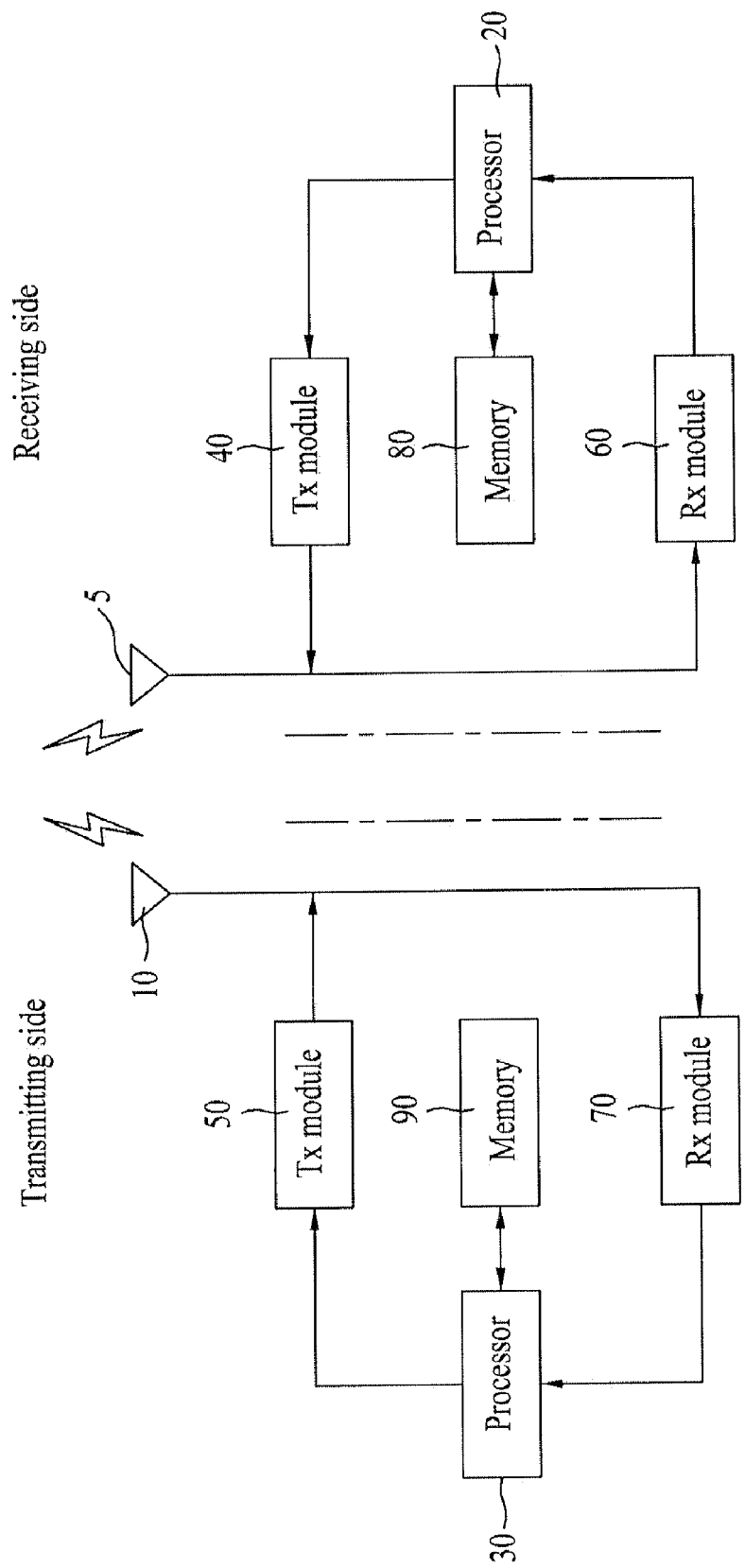
FIG. 9 is a block diagram of one example for structures of transmitting and receiving sides according to another embodiment of the present invention.

FIG. 9 is a block diagram for an example of a transmitting and receiving side structure according to another further embodiment of the present invention.

Referring to FIG. 9, a left side shows a structure of a transmitting side and a right side shows a structure of a receiving side. The transmitting/receiving side can include an antenna 5/10, a processor 20/30, a transmitting (Tx) module 40/50, a receiving (Rx) module 60/70 and a memory 80/90. Each of the elements can perform a corresponding function. The respective elements are explained in detail as follows.

First of all, the antenna 5/10 performs a function of transmitting a signal generated by the Tx module 40/50 externally or a function of receiving a radio signal externally and then delivering the received radio signal to the Rx module 60/70. If MIMO function is supported, at least two antennas can be provided.

The antenna, Tx module and Rx module can configure a radio communication (RF) module.

The processor 20/30 controls overall operations of the transmitting or receiving side in general. For instance, the processor 20/30 can perform a controller function for performing the above described embodiments of the present invention, a MAC (medium access control) frame variable control function, a handover function, an authentication function, an encryption function and the like.

In particular, a processor of a mobile station can determine whether to enter a DCR mode. In case of determining to enter the DCR mode, the processor is able to control the wireless communication module to send a deregistration request message to a base station. In doing so, the processor determines information to be retained by a network entity and is then able to set parameters associated with the corresponding message and is also able to set a request code of the corresponding message to 0x04. The processor of the mobile station controls the wireless communication module to receive a deregistration response message from the base station. The processor checks an action code value of the received message and is then able to determine whether to grant the DCR mode entry request.

In the course of operating in an idle mode, the processor of the mobile station is able to control a ranging request message, in which a ranging purpose code is set to 0x05 to enter a DCR mode, to be sent to the base station.

Afterwards, the processor of the mobile station can control overall functions of the mobile station to operate to cope with the DCR mode. The processor is also able to determine whether to re-enter a network. In case of determining to re-enter the network, the processor is able to control a location update procedure to be executed. For this, the processor controls the wireless communication module to send a ranging request message to the base station. In doing so, the processor sets a ranging purpose code to 0x06 in the ranging request message and then enables CRID to be included therein.

In this case, the CRID can be allocated via a registration response (AAI_REG-RSP) message in case of an initial network entry of the mobile station or can be updated via a deregistration response (AAI_DREG-RSP) message or a ranging response (AAI_RNG-RSP) message.

Besides, the processor of the mobile station is able to control overall operations of the operating processes disclosed in the above described embodiments.

The Tx module 40/50 performs prescribed coding and modulation on data, which is scheduled to be externally transmitted by the processor 20/30, and is then able to deliver the coded and modulated data to the antenna 10/5.

The Rx module 60/70 reconstructs a radio signal externally received via the antenna 5/10 into original data by performing decoding and demodulation on the radio signal and is then able to deliver the reconstructed original data to the processor 20/30.

A program for processing and control of the processor 20/30 can be stored in the memory 80/90. And, the memory 20/30 can perform a function for temporary storage of inputted/outputted data. Moreover, the memory 80/90 can include at least one storage medium of such a type as a flash memory type, a hard disk type, a multimedia card micro type, a card type of memory (e.g., SD memory, XD memory, etc.), a Random Access Memory (RAM) type, an SRAM (Static Random Access Memory type), a Read-Only Memory (ROM) type, an EEPROM (Electrically Erasable Programmable Read-Only Memory) type, a PROM (Programmable Read-Only Memory) type, a magnetic memory type, a magnetic disc type, and optical disc type, and the like.

Meanwhile, a base station uses at least one of the above mentioned modules to perform a controller function for performing the above-described embodiments of the present invention, an OFDMA (orthogonal frequency division multiple access) packet scheduling, TDD (time division duplex) packet scheduling and channel multiplexing function, a MAC (medium access control) frame variable control function according to a service characteristic and electric wave environment, a fast traffic real-time control function, a handover function, an authentication and encryption function, a packet modulation/demodulation function for data transmission, a fast packet channel coding function, a real-time modem control function and the like or can further include separate means, modules and/or parts for performing these functions.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. Moreover, claims failing to be explicitly cited in-between are combined to construct new embodiments or can be included as new claims by Amendment after filing the application.

What is claimed is:

1. A method of a DCR (deregistration with content retention) mode operation of a mobile station in a broadband wireless access system, the method comprising:
   transmitting a registration request (AAI_REG-REQ) message to a base station; and
   receiving a registration response (AAI_REG-RSP) message from the base station,
   wherein the registration response message includes an identifier for identifying the mobile station in association with connection information (Advanced Mobile Station AMS context) of the mobile station in a network including the base station.

2. The method of claim 1, wherein the identifier is a context retention identifier (CRID).

3. The method of claim 2, wherein the registration response message is received when a network entry is performed on the base station or a zone switch from a region supporting a legacy mobile station of the base station to another region supporting an advanced mobile station further advanced than the legacy mobile station is performed.

4. The method of claim 3, further comprising:
   transmitting a first message including a first code indicating a DCR mode entry request to the base station;
   receiving a second message including a second code indicating whether to allow the entry request from the base station; and
   if the second code is set to a value indicating an allowance of the entry request, operating in the DCR mode while a preset timer is valid.

5. The method of claim 4, wherein the first message is a deregistration request (AAI_DREG-REQ) message, wherein the first code indicating the entry request is a deregistration request code (Deregistration_Request_Code) set to 0x04, wherein the second message is a deregistration response (AAI_DREG-RSP) message, and wherein the second code indicating the allowance of the entry request is an action code set to 0x08.

6. A method of a DCR (deregistration with content retention) mode operation of a base station in a broadband wireless access system, the method comprising:
   receiving a registration request (AAI_REG-REQ) message from a mobile station; and
   transmitting a registration response (AAI_REG-RSP) message including an identifier for identifying the mobile station in association with connection information (Advanced Mobile Station AMS context) of the mobile station in a network including the base station to the mobile station.

7. The method of claim 6, wherein the identifier is a context retention identifier (CRID).

8. The method of claim 7, wherein the registration response message is received when a network entry is performed on the base station or a zone switch from a region supporting a legacy mobile station of the base station to another region supporting an advanced mobile station further advanced than the legacy mobile station is performed.

9. The method of claim 8, further comprising:
   receiving a first message including a first code indicating a DCR mode entry request from the mobile station;
   determining whether to allow the entry request;
   when the entry request is allowed, delivering a context of the mobile station to a prescribed network entity; and
   transmitting a second message including a second code indicating an allowance of the entry request to the mobile station.

10. The method of claim 9, wherein the first message is a deregistration request (AAI_DREG-REQ) message, wherein the first code indicating the entry request is a deregistration request code (Deregistration_Request_Code) set to 0x04, wherein the second message is a deregistration response (AAI_DREG-RSP) message, and wherein the second code indicating the allowance of the entry request is an action code set to 0x08.

11. A mobile station which operates in a broadband wireless access system, the mobile station comprising:
    a processor; and
    a radio communication (RF) module configured to transceive a radio signal externally under the control of the processor,
    wherein the processor controls the wireless communication module to send a registration request (AAI_REG-REQ) message to a base station and to obtain an identifier for identifying the mobile station in association with connection information (Advanced Mobile Station AMS context) of the mobile station in a network including the base station via a registration response (AAI_REG-RSP) message received from the base station in response to the registration request message.

12. The mobile station of claim 11, wherein the identifier is a context retention identifier (CRID).

13. The mobile station of claim 12, wherein the registration response message is received when a network entry is performed on the base station or a zone switch from a region supporting a legacy mobile station of the base station to another region supporting an advanced mobile station further advanced than the legacy mobile station is performed.

14. The mobile station of claim 13, wherein the processor controls the wireless communication unit to send a first message including a first code indicating a DCR mode entry request to the base station and wherein if a second message including a second code indicating whether to allow the entry request is received from the base station and if the second code is set to a value indicating an allowance of the entry request, the processor controls to operate in the DCR mode while a preset timer is valid.

15. The mobile station of claim 14, wherein the first message is a deregistration request (AAI_DREG-REQ) message, wherein the first code indicating the entry request is a deregistration request code (Deregistration_Request_Code) set to 0x04, wherein the second message is a deregistration response (AAI_DREG-RSP) message, and wherein the second code indicating the allowance of the entry request is an action code set to 0x08.

* * * * *